UNITED STATES PATENT OFFICE.

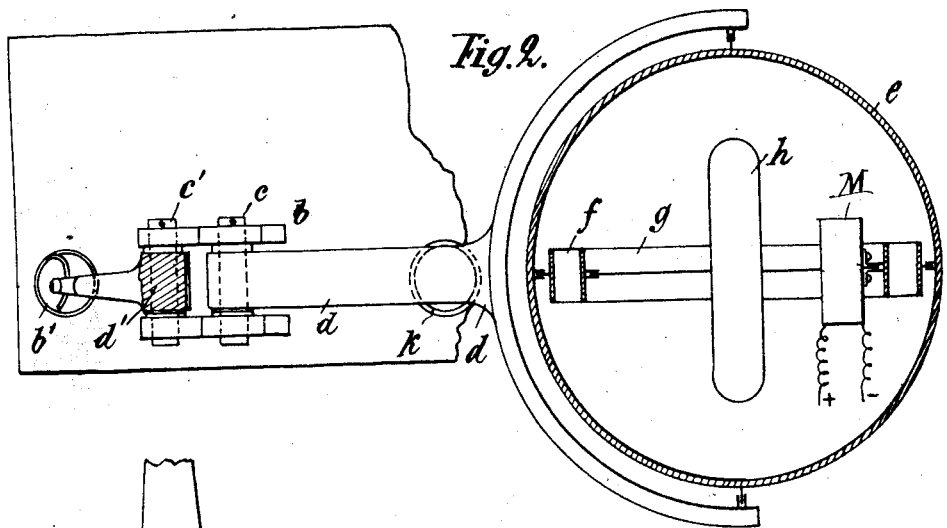
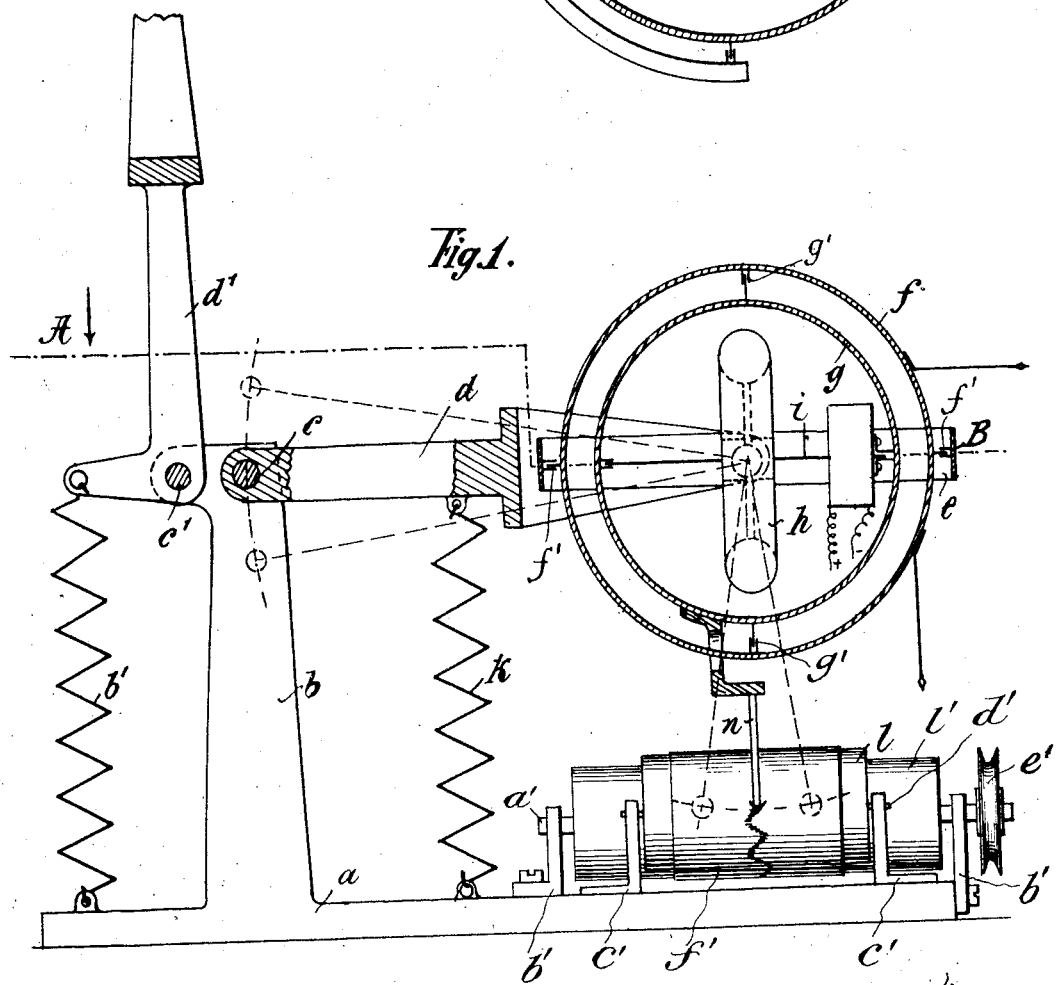

JOHANN SCHÜTTE, OF BREMERHAVEN, GERMANY.

INSTRUMENT FOR RECORDING AND MEASURING VIBRATIONS.

No. 859,123.  Specification of Letters Patent.  Patented July 2, 1907.

Application filed June 14, 1904. Serial No. 212,456.

*To all whom it may concern:*

Be it known that I, JOHANN SCHÜTTE, a subject of the German Emperor, residing at Bremerhaven, (free and hansa-town Bremen,) in the Empire of Germany, have invented certain new and useful Improvements in an Instrument for Recording and Measuring Vibrations, of which the following is a full, clear, and exact description.

This invention relates to apparatus for recording and measuring the oscillations of ships, railway vehicles, buildings, and the like, which are exposed to vibrations, for which purpose the ordinary pendulum has been used hitherto, the comparatively heavy mass of which is suspended by springs. Such a pendulum has the great disadvantage for exact experiments, that it starts a swinging movement of its own which cannot be distinguished with certainty from the oscillations of the ship, vehicle, building or the like to be examined.

The object of this invention is to overcome the disadvantage of the ordinary pendulum and this invention consists of an instrument in which a quickly rotating freely suspended swinging mass is connected with a measuring or recording device in such a manner that the relative motions of this mass as distinguished from the vibrations of the body to be examined, are recorded in consequence of the gyrostatic action of such mass. Therefore while the body, the oscillations of which are to be examined, for instance a railway vehicle, a ship or the like, is in motion, the quickly rotating body of the instrument remains at rest in consequence of the gyrostatic action, so that by means of suitably interposed elements, the relative movements of the body to be examined as distinct from the quickly rotating swinging mass are recorded on a moving paper strip.

Instead of one rotary swinging mass a number may be employed, the axes of which are parallel to the three coördinate axes of space; thus it will be possible to measure by an instrument constructed according to this invention vertical oscillations as also transverse or longitudinal oscillations.

In order that this invention may be the better understood, I now proceed to describe the same with reference to the accompanying drawings and to the letters and figures marked thereon.

Like letters refer to like parts in the various figures.

Figure 1 is a part sectional side view of the apparatus and Fig. 2 is a part sectional plan thereof on the line A—B of Fig. 1.

$a$ is the base plate carrying a standard $b$ on which is arranged a forked arm $d$ adapted to pivot on a pin $c$. The forked arm $d$ carries three rings $e, f$ and $g$ arranged in the form of a gimbal joint. The ring $g$ is pivoted at $g'$ to the ring $f$ and the ring $f$ is pivoted at $f'$ to the ring $e$. In the inner ring $g$ is supported on an axle $i$, a rotary swinging mass $h$. The fork $d$ is supported in its horizontal position by a spring $k$. A suitable recording pointer $n$ is attached to the ring $g$ and works over a band or tape $f'$ as shown. When the disk $h$ is rotated rapidly through any suitable means, such, for example, as an electric motor diagrammatically shown at M and assuming that the base plate $a$ with the standard $b$ is situated on the body which vibrates for instance vertically, the forked arm $d$ on the pivot $c$, will make pendulum oscillations which however are not followed by the gimbal jointed swinging mass in consequence of the gyrostatic action of the latter. A marker or recording pointer connected with the inner frame $g$ can thus record on the rotary drum $l$ or on a continuous paper strip, the relative movement of the forked arm $d$ and consequently of the vibrating body as distinct from the quickly rotating swinging mass $h$. A means for supporting and operating the recording strip is shown in Fig. 1. An additional drum $l'$ is carried by an axle $a'$ resting in bearings $b'$ connected to the bottom plate $a$. Reference letter $c'$ denotes the bearings of the axle $d'$ of drum $l$ on which the recorder $n$ is acting. A pulley $e'$ is fixedly mounted on shaft $a'$ and serves to give drum $l'$ a rotating movement. The endless strip $f'$ is wound off from drum $l$ and wound up by drum $l'$, in consequence of the rotation of this latter.

In the construction shown by way of example, the marker $n$ is fixed to the inner ring $g$ but it may be equivalently arranged on one of the two outer rings $f$ and $e$ instead. If the body to be examined vibrates in more than one direction, one apparatus will be sufficient to measure and record these vibrations successively i. e. each separately, by placing the apparatus successively into positions suitable for the indicating of the kind of oscillation to be measured at a time. However, the apparatus may be constructed so that the vibrations in different directions may be recorded and indicated simultaneously, for which purpose two forked arms may be arranged on the standard $b$, each of such arms carrying a gimbal jointed swinging mass. For instance, a forked arm $d'$ pivoting on a pin $c'$, and shown only in part in the drawings may carry the second gimbal jointed swinging mass. A spring $b'$ is designed to maintain the forked arm $d'$ in its vertical position.

It will be understood that the gyroscope applied to the arm $d'$ is substantially like that on the arm $d$, and need not, therefore, be again described in detail.

What I claim and desire to secure by Letters Patent is:

1. In an instrument for measuring and recording the vibrations of a body, a standard adapted to be fixed to the vibrating body, a forked arm pivoted to said standard and spring supported therefrom so as to normally lie in a horizontal position, gimbal rings on the end of said forked arm, a gyroscope supported thereby, a marker or recording pointer connected to said gyroscope so as to indicate the plane of rotation thereof, and a means for continuously moving a strip in the path of said pointer, said means being supported by the vibrating body, whereby a record of the vibrations of said body is made by the pointer.

2. In an instrument for measuring and recording the vibrations of a body, a standard fixed to the body, a forked arm pivoted to said standard and having a gyroscope connected thereto, a shaft for rotating said gyroscope, a driving wheel supported by said standard and connected to rotate said shaft, a spring for supporting the forked arm in normally horizontal relation with respect to said body, and a pointer attached to the gyroscope and adapted to indicate the plane thereof with respect to the body.

In witness whereof, I subscribe my signature, in presence of two witnesses.

JOHANN SCHÜTTE.

Witnesses:
CHR. LANGE,
W. BERKER.